United States Patent
Hwang et al.

(10) Patent No.: US 8,730,305 B2
(45) Date of Patent: May 20, 2014

(54) DIGITAL PHOTOGRAPHING APPARATUS HAVING COMMON ANGLE OF VIEW DISPLAY FUNCTION, METHOD OF CONTROLLING THE DIGITAL PHOTOGRAPHING APPARATUS, AND MEDIUM FOR RECORDING THE METHOD

(75) Inventors: Yong-ha Hwang, Suwon-si (KR); Soon-geun Jang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 13/040,403

(22) Filed: Mar. 4, 2011

(65) Prior Publication Data

US 2011/0216168 A1      Sep. 8, 2011

(30) Foreign Application Priority Data

Mar. 4, 2010  (KR) .................. 10-2010-0019574

(51) Int. Cl.
*H04N 15/00*   (2006.01)
*H04N 13/02*   (2006.01)
*H04N 5/225*   (2006.01)
*H04N 13/00*   (2006.01)

(52) U.S. Cl.
CPC ......... *H04N 13/0203* (2013.01); *H04N 5/2258* (2013.01); *H04N 2013/0074* (2013.01); *H04N 13/0055* (2013.01)
USPC .......................................... 348/47

(58) Field of Classification Search
CPC ............ H04N 13/0203; H04N 5/2258; H04N 2013/0074; H04N 13/0055
See application file for complete search history.

(56) References Cited

U.S. PATENT DOCUMENTS

| | | | |
|---|---|---|---|
| 2003/0090567 A1* | 5/2003 | Sasaki et al. | 348/136 |
| 2004/0066555 A1 | 4/2004 | Nomura | |
| 2008/0309784 A1* | 12/2008 | Asari et al. | 348/222.1 |
| 2009/0309987 A1* | 12/2009 | Kimura et al. | 348/218.1 |

FOREIGN PATENT DOCUMENTS

JP      2001-022014 A      1/2001

OTHER PUBLICATIONS

Takahashi, WO 2009/116663 A1 English Translation.*

* cited by examiner

*Primary Examiner* — Joseph Ustaris
*Assistant Examiner* — Jill Sechser
(74) *Attorney, Agent, or Firm* — Drinker Biddle & Reath LLP

(57) ABSTRACT

A digital photographing apparatus includes a plurality of image pickup units that capture a plurality of images, a first image processing unit that generates a single input image from the plurality of images, a second image processing unit that generates a display image comprising common angle of view information in which the angle of view information of each of the plurality of image pickup units with respect to the single input image overlap, and a display unit that displays the display image. Each of the plurality of images shows a different parallax with respect to a subject, and each of the plurality of image pickup units have angle of view information.

11 Claims, 5 Drawing Sheets

DIGITAL PHOTOGRAPHING APPARATUS HAVING COMMON ANGLE OF VIEW DISPLAY FUNCTION, METHOD OF CONTROLLING THE DIGITAL PHOTOGRAPHING APPARATUS, AND MEDIUM FOR RECORDING THE METHOD

CROSS-REFERENCE TO RELATED PATENT APPLICATION

This application claims the priority benefit of Korean Patent Application No. 10-2010-0019574, filed on Mar. 4, 2010, in the Korean Intellectual Property Office, the entire disclosure of which is incorporated herein by reference.

BACKGROUND

1. Field of the Invention

One or more embodiments relate to a digital photographing apparatus including a plurality of image pickup devices for capturing a plurality of images each showing a different parallax with respect to a subject, a method of controlling the digital photographing apparatus, and a recording medium having embodied thereon a computer program for executing the method.

2. Description of the Related Art

Digital cameras including a plurality of image pickup devices have become widely used. These digital cameras capture a plurality of images each showing a different parallax with respect to a subject, combine the images, and produce 3D images. However, these digital cameras can produce 3D images only when a subject is positioned within an angle of view region common to each image pickup device. For example, when a digital camera photographs a subject very close thereto, it is highly possible that the subject will not be positioned within a common angle of view region of the image pickup devices of the digital camera. In this case, there is no method of checking beforehand whether the subject is positioned within the common angle of view region.

SUMMARY

One or more embodiments include a digital photographing apparatus including a plurality of image pickup devices for capturing a plurality of images each showing a different parallax with respect to a subject by displaying a common angle of view region on a display unit so that a photographer can easily generate a 3D image, a method of controlling the digital photographing apparatus, and a recording medium having embodied thereon a computer program for executing the method.

Additional aspects will be set forth in part in the description which follows and, in part, will be apparent from the description, or may be learned by practice of the presented embodiments.

According to one or more embodiments, there is provided a digital photographing apparatus. The digital photographing apparatus includes a plurality of image pickup units that capture a plurality of images, a first image processing unit that generates a single input image from the plurality of images, a second image processing unit that generates a display image comprising common angle of view information in which the angle of view information of each of the plurality of image pickup units with respect to the single input image overlap, and a display unit that displays the display image. Each of the plurality of images shows a different parallax with respect to a subject, and each of the plurality of image pickup units have angle of view information.

The display image may include an on-screen display (OSD) that represents the common angle of view information.

A region of the display image excluding the common angle of view information may be colored black.

The first image processing unit may generate the single input image by combining the plurality of images inputted through the plurality of image pickup units.

The second image processing unit may extract the common angle of view information from a distance between the digital photographing apparatus and the subject and the angle of view information.

According to one or more embodiments, there is provided a method of controlling a digital photographing apparatus that includes a plurality of image pickup units that capture a plurality of images, and each of the plurality of images showing a different parallax with respect to a subject. The method includes: generating a single input image from the plurality of images inputted through the plurality of image pickup units, each of the plurality of image pickup units having angle of view information; generating a display image including common angle of view information in which the angle of view information of each of the plurality of image pickup units with respect to the single input image overlap; and displaying the display image.

The display image may include an OSD representing the common angle of view information.

A region of the display image excluding the common angle of view information may be colored black.

The generating of the single input image may include generating the single input image by combining the plurality of images inputted through the plurality of image pickup units.

The method may further include extracting the common angle of view information from a distance between the digital photographing apparatus and the subject and the angle of view information.

According to one or more embodiments, there is provided a computer readable recording medium having embodied thereon a computer program for executing the method of controlling a digital photographing apparatus.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
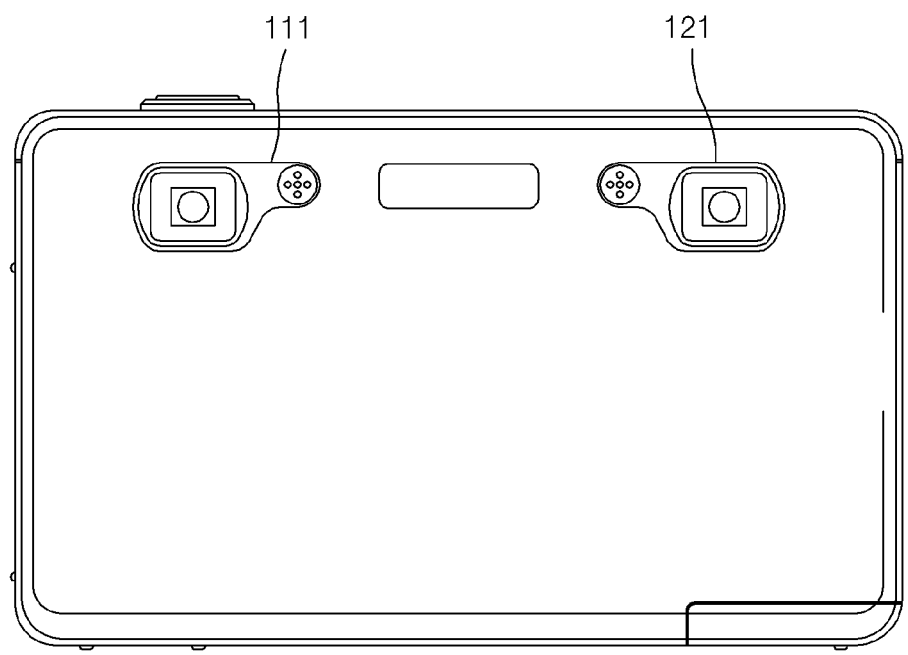
FIG. 1 shows a front surface of a digital photographing apparatus according to an embodiment.

As the invention allows for various changes and numerous embodiments, particular embodiments will be illustrated in the drawings and described in detail in the written description. However, this is not intended to limit the invention to particular modes of practice, and it is to be appreciated that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

While such terms as "first," "second," etc., may be used to describe various components, such components must not be limited to the above terms. The above terms are used only to distinguish one component from another.

The terms used in the present specification are merely used to describe particular embodiments, and are not intended to limit the invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. The use of any and all examples, or exemplary language (e.g. "such as") provided herein, is intended merely to better illuminate the invention and does not pose a limitation on the scope of the invention unless otherwise claimed. No item or component is essential to the practice of the invention unless the element is specifically described as "essential" or "critical". It will also be recognized that the terms "comprises," "comprising," includes," "including," "has," and "having," as used herein, are specifically intended to be read as open-ended terms of art. The use of the terms "a," "an," "the," and similar referents in the context of describing the invention (especially in the context of the claims) are to be construed to cover both the singular and the plural, unless the context clearly indicates otherwise.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Reference will now be made in detail to embodiments, examples of which are illustrated in the accompanying drawings, wherein like reference numerals refer to like elements throughout.

FIG. 1 shows a front surface of a digital photographing apparatus according to an embodiment. Referring to FIG. 1, a digital camera 100 is shown as an example of the digital photographing apparatus. However, the digital photographing apparatus is not limited to the digital camera 100 and may also be a digital device, such as a video camera, a camera phone, a personal digital assistant (PDA), a portable multimedia player (PMP), or an MP3 player.

A plurality of optical units 111 and 121 can be disposed on a front surface of the digital camera 100. The optical units 111 and 121 may be spaced apart from each other by a predetermined gap, for example, between about 3.5 cm to about 7 cm.

The optical units 111 and 121 can be disposed on the front surface of the digital camera 100 so that the digital camera 100 can capture a plurality of images each showing a different parallax with respect to a subject. In one embodiment, the optical unit 111 may be a first optical unit 111 and the optical unit 121 may be a second optical unit 121. However, the number of the optical units is not limited thereto, and there may be three or more optical units. Further, even if a single optical unit is disposed on the front surface of the digital camera 100, the digital camera 100 can include a plurality of image pickup devices and capture a plurality of images each showing a different parallax with respect to a subject.

The digital camera 100 will now be described in more detail with reference to FIG. 2.

Figure 2:
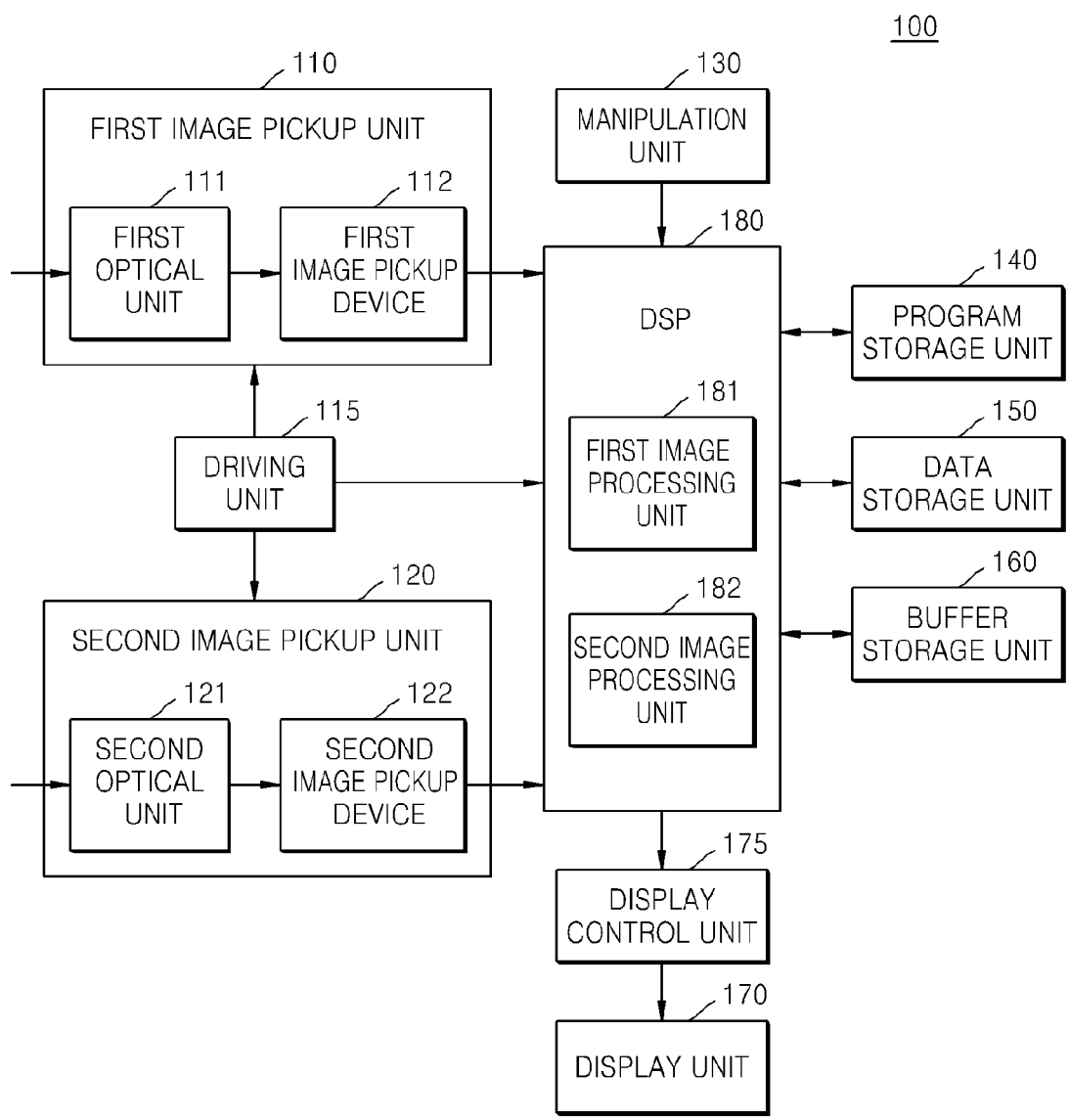
FIG. 2 is a block diagram illustrating a digital camera, according to an embodiment.

FIG. 2 is a block diagram illustrating the digital camera 100 according to an embodiment.

Referring to FIG. 2, the digital camera 100 can include a plurality of image pickup units 110 and 120, respectively, including the optical units 111 and 121 disposed on the front surface of the digital camera 100, a digital signal processing (DSP) unit 180, a manipulation unit 130, a program storage unit 140, a data storage unit 150, a buffer storage unit 160, a display unit 170, and a display control unit 175.

The first image pickup unit 110 may include the first optical unit 111 and a first image pickup device 112. The first optical unit 111 may include at least one lens such as, a zoom lens that can enlarge or reduce an angle of view according to a focal length required to focus on a subject and a focus lens that can control focusing on the subject. However, embodiments are not limited thereto. The first optical unit 111 may further include an iris (not shown) that can adjust an amount of light and a shutter (not shown) that can control an input of an optical signal.

After light from the subject passes through the first optical unit 111, an image of the subject can be formed on a light receiving surface of the first image pickup device 112. A charge-coupled device (CCD) or a complementary metal oxide semiconductor image sensor (CIS) that can convert an optical signal into an electrical signal may be used as the first image pickup device 112.

According to the present embodiment, the second optical unit 121 and a second image pickup device 122 included in the second image pickup unit 120 can perform the same functions or functions similar to those of the first optical unit 111 and the first image pickup device 112 included in the first image pickup unit 110, and thus detailed descriptions thereof will not be repeated.

According to the present embodiment, the first image pickup unit 110 may include a first angle of view information, and the second image pickup unit 120 may include a second angle of view information. The angle of view information can be an angle or a visual field seen through a lens included in each image pickup device 112 or 122 and may be expressed as an angular measure (° or rad). The angle of view information may be determined according to a focal length of lens included in each image pickup device 112 or 122 and a width of each image pickup device 112 or 122. For example, the angle of view information may be determined according to equation 1 below.

$$\text{angle of view information} = 2 \times \tan^{-1}\{\text{width of image pickup device}/(2 \times \text{focal length of lens})\} \quad \text{[Equation 1]}$$

A driving unit 115 may drive the first image pickup unit 110 and the second image pickup unit 120 according to exposure information and focal length information provided by an image signal or an external control signal inputted through the manipulation unit 130. The driving unit 115 may control positioning of lenses, opening of an iris, an operation of a shutter, and sensitivity of image pickup devices 112 or 122. The driving unit 115 may simultaneously control the elements included in the first image pickup unit 110 and the second image pickup unit 120; however, embodiments are not limited thereto. The driving unit 115 may individually control the elements included in the first image pickup unit 110 and the second image pickup unit 120.

The manipulation unit 130 may receive a control signal input from outside the digital camera 100. The manipulation unit 130 can include various function buttons, such as a shutter release button that can expose the first image pickup device 112 and/or the second image pickup device 122 to light for a predetermined time, a power button that can supply power, wide-zoom and tele-zoom buttons that can widen or narrow the viewing angle according to an input, text input buttons, a mode selection button that can select a photographing mode or a reproducing mode, and setting buttons that can set white balance and exposure. According to the present embodiment, the manipulation unit 130 may include a functional button that can produce a common angle of view preview control signal. Although the manipulation unit 130 may include the above-described various buttons, embodiments are not limited thereto. The manipulation unit 130 may be implemented in any form through which the user may input signals, such as a keyboard, a touch pad, a jog dial, or a remote controller.

The program storage unit 140 can store a program, such as an operating system that can control an operation of the digital camera 100. In the present embodiment, the program storage unit 140 may store common angle of view information according to a distance between a subject and the digital camera 100 corresponding to the first angle of view information and the second angle of view information. The program storage unit 140 can extract and transmit the common angle of view information to the DSP 180 according to a program stored in the program storage unit 140.

The data storage unit 150 may store an image file including a main image, a thumbnail image, and a plurality of screen nail images. The data storage unit 150 may further store images necessary for executing the program.

The digital camera 100 can include the buffer storage unit 160. The buffer storage unit 160 may temporally store data necessary for performing an arithmetic operation or resultant data. A semiconductor memory that can record or maintain data when power is supplied to the digital camera 100, for example, a synchronous dynamic RAM (SDRAM), may be used as the buffer storage unit 160. Also, a semiconductor memory that can record or maintain data irrespective of whether power is supplied to the digital camera 100 may be used as the program storage unit 140 or the data storage unit 150. A flash memory that can record or maintain data when power is supplied to the digital camera 100 and has no data loss by continuously being supplied power may be used as the program storage unit 140 or the data storage unit 150.

The display unit 170 can display an image or various types of information. The display unit 170 may be formed of, for example, a liquid crystal display (LCD) panel, an organic light-emitting diode (OLED) panel, or an electrophoretic display (EPD) panel. In the present embodiment, the digital camera 100 may include a plurality of display units 170. For example, among the display units 170, a first display unit may be disposed in the front surface of the digital camera 100, and a second display unit may be disposed in a rear surface of the digital camera 100. The display unit 170 can receive image data from the display control unit 175 and can form a predetermined image. In the present embodiment, the display control unit 175 can receive a display image including the common angle of view information from the DSP 180 and can provide the display unit 170 with image data corresponding to the display image.

The DSP 180 included in the digital camera 100 can perform various arithmetic operations according to the program stored in the program storage unit 150 and can control each element according to an arithmetic operation result.

The DSP 180 may include a first image processing unit 181 and a second image processing unit 182. The first image processing unit 181 can generate a plurality of images inputted through the image pickup units 110 and 120 into a single input image. The second image processing unit 182 can extract the common angle of view information that overlaps the angle of view information included in the image pickup units 110 and 120 with respect to the single input image.

The first image processing unit 181 can combine an image input through the first image pickup unit 110 and an image input through the second image pickup unit 120 and can generate a single input image. For example, the first image processing unit 181 can analyze image elements, such as exposure, focusing, and color tone of the image inputted through the first image pickup unit 110 and the image inputted through the second image pickup unit 120 and can combine the different images into the single input image. The single input image may be a 3D image. However, the method of generating the single input image is not limited thereto.

The second image processing unit 182 can extract the common angle of view information in which the first angle of view information of the first image pickup device 110 and the second angle of view information of the second image pickup device 120 with respect to the input image generated by the first image processing unit 181 overlap. That is, the second image processing unit 182 can extract the common angle of view information in which a region of the first angle of view information and a region of the second angle of view information overlap. The common angle of view information may be extracted from the distance between the subject and the digital camera 100, the first angle of view information, or the second angle of view information. The common angle of view information may be represented as an on-screen display (OSD) on the single input image generated by the first image processing unit 181 or may be represented by coloring black, for example, a region of the single input image excluding the common angle of view information. The second image processing unit 182 can generate a display image including the common angle of view information extracted as described above.

Although not shown in FIG. 2, the digital camera 100 may further include an output signal extracting unit (not shown) that can extract an output signal when the subject is beyond a common angle of view region in the display image including the common angle of view information and an output unit (not shown) that can output the output signal. The output signal may be, for example, an audio output signal. The output unit may be, for example, a speaker. However, embodiments are not limited thereto, and the output signal may be a light emission signal, and the output unit may be a lamp. The output signal may also be a popup output signal, and the output unit may be a display unit 170.

In an embodiment, the common angle of view information can be displayed on the display unit 170, and thus a photographer can photograph a subject after checking whether the subject is included in the common angle of view region. When the subject is beyond the common angle of view region, the photographer can be informed of this fact and thus may correctly frame the subject.

Figure 3:
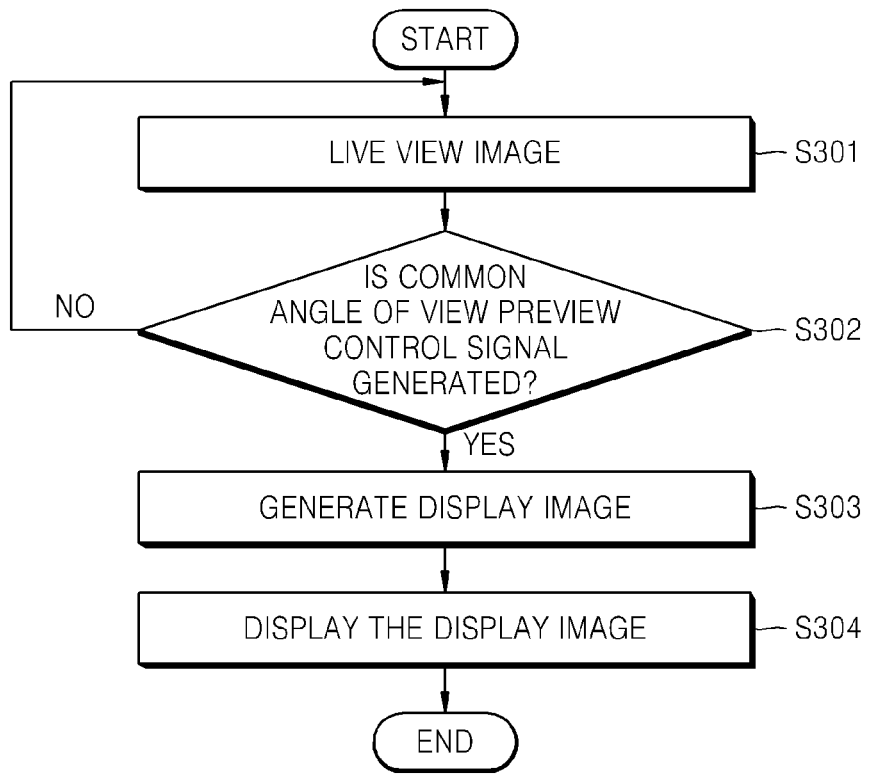
FIG. 3 is a flowchart illustrating a method of controlling the digital camera of FIG. 2, according to an embodiment.

FIG. 3 is a flowchart illustrating a method of controlling the digital camera 100, according to an embodiment.

Referring to FIG. 3, the digital camera 100 may display a live view image on the display unit 170 in real time (operation S301).

The digital camera 100 can determine whether a common angle of view preview control signal is generated (operation S302). The common angle of view preview control signal may be generated according to a photographer's manipulation of a functional button of the manipulation unit 130. The common angle of view preview control signal may be generated manually by the photographer or automatically in specific cases.

If the common angle of view preview control signal is not generated, the live view image can be continuously displayed on the display unit 170 (operation S301).

If the common angle of view preview control signal is generated, the digital camera 100 can generate a display image (operation S303). The display image can present common angle of view information. For example, the display image may include an OSD representing the common angle of view information. A region of the display image excluding the common angle of view information may also be colored black, for example. In addition, a variety of methods may be used to represent the common angle of view information on the display image.

The digital camera 100 can display the display image on the display unit 170 (operation S304) in order to inform the photographer of the common angle of view information so that the photographer may acquire a desired image.

Figure 4:
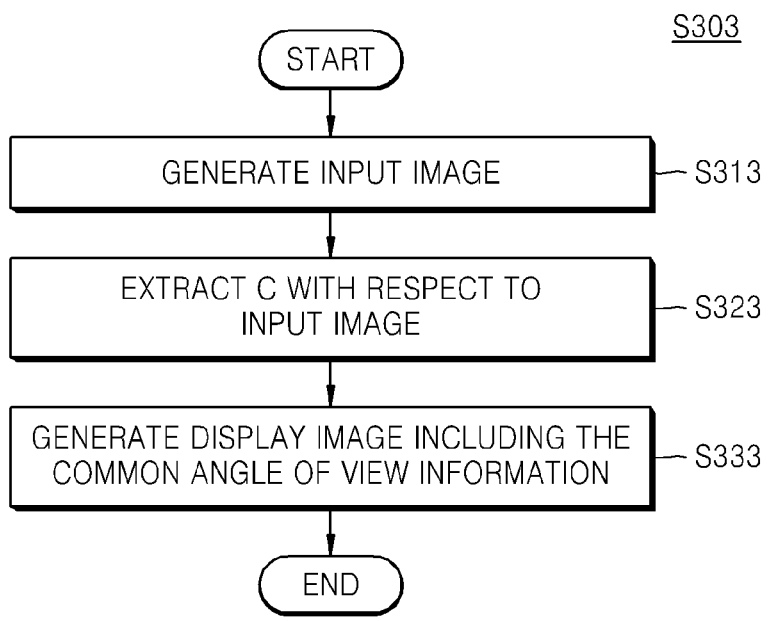
FIG. 4 is a flowchart illustrating an operation of generating a display image, according to an embodiment.

FIG. 4 is a flowchart illustrating the operation of generating the display image (for example, operation S303 of the method shown in FIG. 3), according to an embodiment.

Referring to FIG. 4, an input image can be generated from a plurality of images that may be inputted through the image pickup units 110 and 120 each having angle of view information (operation S313). A single input image may be generated by combining the images inputted through the image pickup units 110 and 120. The input image may be a 3D image.

Common angle of view information in which angle of view information of the first image pickup unit 110 and angle of view information of the second image pickup unit 120 with respect to the input image overlap may be extracted (operation S323). A method of extracting the common angle of view information from a distance between the digital camera 100 and a subject and angle of view information of the image pickup unit 110 or 120 is described below, according to an embodiment.

The distance between the digital camera 100 and the subject can be measured. For example, a photographer may extract the distance between the digital camera 100 and the subject by pressing a shutter release button halfway to focus on the subject. However, embodiments are not limited thereto, and the distance between the digital camera 100 and the subject may be extracted by using, for example, a method of inversely estimating the distance between the digital camera 100 and the subject via a parallax between the first optical unit 111 and the second optical unit 121. The distance between the digital camera 100 and the subject may also be obtained by measuring a time taken to shoot light to the subject and have it return back by using a sensor.

The first angle of view information of the first image pickup unit 110 or the second angle of view information of the second image pickup unit 120 can be extracted. The first angle of view information may be determined according to a focal length of lenses included in the first image pickup unit 110 and a width of the first image pickup device 112 included in the first image pickup unit 110. The focal length of lenses may be previously determined during manufacturing if the lenses are not exchangeable. The first angle of view information may be expressed as an angular measure according to Equation 1 above. The second angle of view information may be determined according to lenses included in the second image pickup unit 120 and the characteristics of the second image pickup device 122 in the same manner as described with respect to the first angle of view information and may be expressed as an angular measure.

Figure 5:
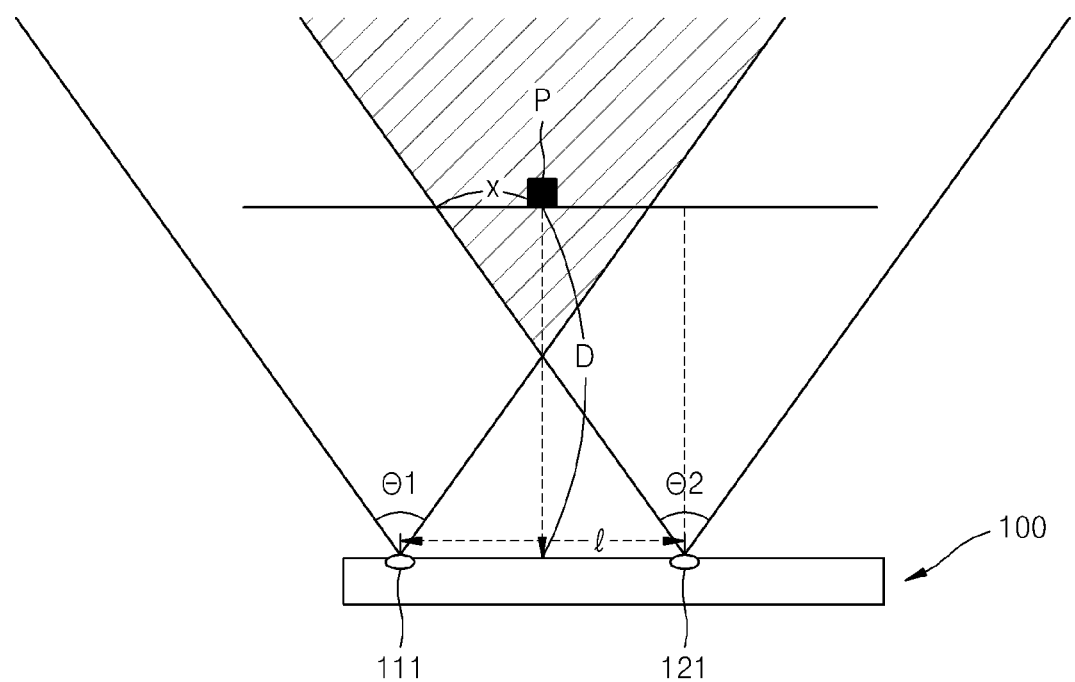
FIG. 5 is a view for explaining a method of extracting common angle of view information, according to an embodiment.

FIG. 5 is a view for explaining a method of extracting common angle of view information, according to an embodiment.

Referring to FIG. 5, a distance X indicating a distance from a subject P to a straight line for forming a common angle of view may be extracted from Equation 2 below. The distance X can be common angle of view information with respect to the focused subject P. The common angle of view information can be expressed as a length; however, embodiments are not limited thereto. The common angle of view information may be expressed as an angular measure and an area. The first angle of view information of the first image pickup unit 110 and the second angle of view information of the second image pickup unit 120 can be the same as each other, as shown for the embodiment of FIG. 5. Further, the subject P can be positioned on a straight line perpendicular to and centered on a segment of a line connecting the first optical unit 111 and the second optical unit 121.

$$X = \text{distance between subject and digital camera} \times \tan(\text{first angle of view information}/2) - (\text{distance between first optical unit and second optical unit}/2)$$ [Equation 2]

Although the method of extracting the common angle of view information can be by measuring the distance between the digital camera 100 and the subject P in view of the focused subject P in the embodiment shown in FIG. 5, embodiments are not limited thereto. According to another embodiment, the common angle of view information, in which the first angle of view information and the second angle of view information overlap, may be previously stored in the program storage unit 140 during manufacturing. Since the first angle of view information and the second angle of view information can be determined according to focal lengths of lenses and widths of image pickup devices 112, 122 in the digital camera 100, the first angle of view information and the second angle of view information can be determined during manufacturing. Further, since positions of the first image pickup unit 110 including the first angle of view information and the second image pickup unit 120 including the second angle of view information can be fixed or changed according to a program, the first angle of view information and the second angle of view information may be predicted. In more detail, an area of an angle of view may be calculated from the first angle of view information by combining a horizontal unit line and a straight unit line. An area of an angle of view may be calculated from the second angle of view information in the same manner as with the first angle of view information. An area of a common angle of view in which the area of the angle of view calculated from the first angle of view information and the area of the angle of view calculated from the second angle of view information overlap can change according to the distance between the subject P and the digital camera 100. For example, if the area of the common angle of view is A when the distance between the subject P and the digital camera 100 is between about 1 m and about 1.1 m, the area of the common angle of view may be B when the distance between the subject P and the digital camera 100 is between about 1.1 m and about 1.2 m. As described above, a table including a result of matching the common angle of view information and the distance between the subject P and the digital camera 100 may be generated using a method of trial and error and can be stored in the program storage unit 140 during manufacturing. The digital camera 100 may measure the distance between the subject P and the digital camera 100 in response to a common angle of view preview control signal and can extract common angle of view information corresponding to the distance from the program storage unit 140. In addition, embodiments are not limited to the exemplary embodiments described in the specification and a variety of methods may be used to extract the common angle of view information from a digital camera including a plurality of image pickup units.

The digital camera 100 may generate a display image including the common angle of view information (operation S333). The display image can be displayed on the display unit 170.

Figure 6A:
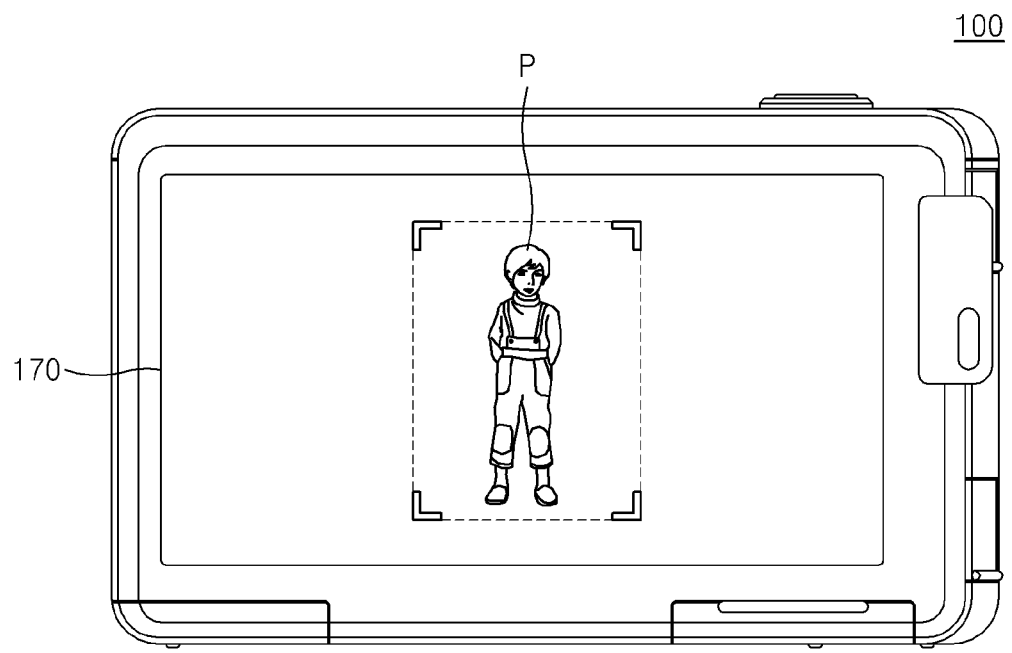
FIGS. 6A and 6B show exemplary display images, according to an embodiment.
Figure 6B:
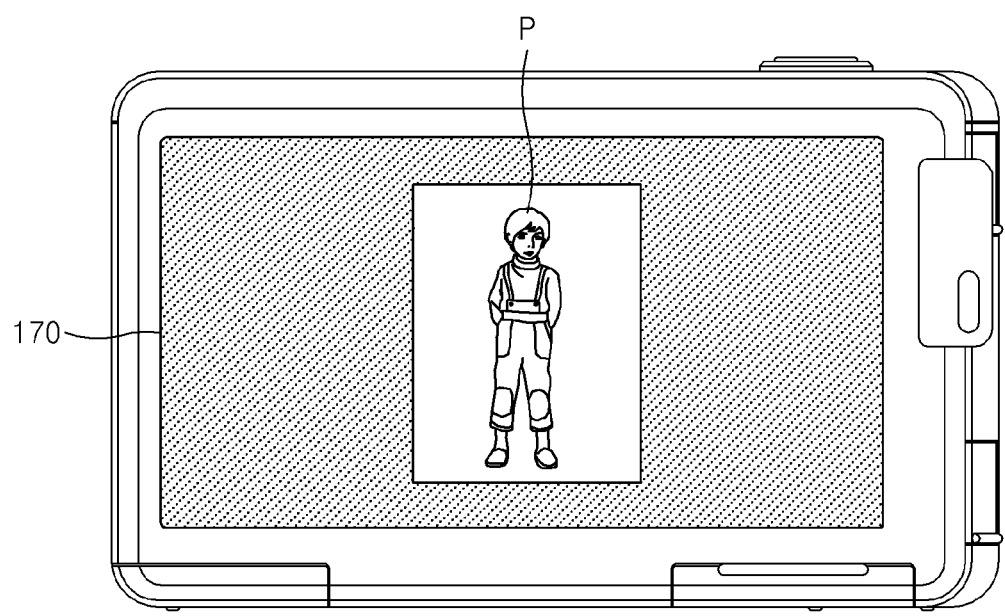

FIGS. 6A and 6B show exemplary display images, according to an embodiment.

Referring to FIG. 6A, a display image may include an OSD representing common angle of view information. A subject P can be positioned within a boundary, and thus a photographer can check framing of the subject P within a common angle of view region visually. Turning to FIG. 6B, a region of a display image excluding the common angle of view information may be colored black. The subject P can be positioned within a region of the display image that is not colored black, as shown in FIG. 6B, and thus the photographer can check framing of the subject P within the common angle of view region visually. Embodiments are not limited thereto, and a variety of methods may be used to generate and display a display image including common angle of view information.

According to embodiments, common angle of view information generated by a plurality of image pickup units can be displayed on the display unit 170, and thus a photographer can easily acquire common angle of view information suitable for a desired image. Thus, the photographer can frame a subject according to the common angle of view information. In particular, when a digital camera photographs a subject very close thereto, it is highly possible that the subject is positioned beyond a common angle of view region formed by image pickup units. In this case, the photographer can check in advance whether the subject is positioned within the common angle of view region, which prevents a photographing failure.

The embodiments may also be embodied as computer readable code on a computer readable recording medium. The computer readable recording medium can be any data storage device that may store data which may be thereafter read by a computer system.

Examples of the computer readable recording medium include read-only memory (ROM), random-access memory (RAM), CD-ROMs, magnetic tapes, floppy disks, optical data storage devices, etc. The computer readable recording medium may also be distributed over network coupled computer systems so that the computer readable code is stored and executed in a distributed fashion. This medium can be read by the computer, stored in the memory, and executed by the processor. Also, functional programs, code, and code segments for accomplishing the embodiments may be easily construed by programmers of ordinary skill in the art to which the embodiments pertain.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media, random-access memory (RAM), read-only memory (ROM), CD-ROMs, DVDs, magnetic tapes, hard disks, floppy disks, and optical data storage devices.

For the sake of brevity, conventional electronics, control systems, software development, and other functional aspects of the apparatus (and components of the individual operating components of the apparatus) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections, or logical connections may be present in a practical device.

The steps of all methods described herein can be performed in any suitable order unless otherwise indicated herein or otherwise clearly contradicted by context.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

While the embodiments have been particularly shown and described with reference to exemplary embodiments thereof, it will be understood by those of ordinary skill in the art that various changes in form and details may be made therein without departing from the spirit and scope of the embodiments as defined by the appended claims. The exemplary embodiments should be considered in a descriptive sense only and not for purposes of limitation. Therefore, the scope of the embodiments of the invention is defined not by the detailed description of the embodiments of the invention but by the appended claims, and all differences within the scope will be construed as being included in the embodiments of the preset invention.

All references, including publications, patent applications, and patents, cited herein are hereby incorporated by reference to the same extent as if each reference were individually and specifically indicated to be incorporated by reference and were set forth in its entirety herein.

What is claimed is:

1. A digital photographing apparatus comprising:
  a single portable enclosure comprising the following elements:

a plurality of image pickup units disposed on a front surface of the enclosure that capture a plurality of images, each of the plurality of images showing a different parallax with respect to a subject, each of the plurality of image pickup units having angle of view information;

a first image processing unit that generates a single input image from the plurality of images;

a second image processing unit that generates a display image comprising a common angle of view region visually displayed on the single input image, denoting an area in which the angle of view information of each of the plurality of image pickup units overlaps;

a display unit that displays the display image;

an output signal extracting unit that extracts an output signal when the subject is beyond the common angle of view region in the display image including the common angle of view information; and an output unit that outputs the output signal.

2. The digital photographing apparatus of claim 1, wherein the display image comprises an on-screen display (OSD) that represents the common angle of view information.

3. The digital photographing apparatus of claim 1, wherein a region of the display image excluding the common angle of view information is colored black.

4. The digital photographing apparatus of claim 1, wherein the first image processing unit generates the single input image by combining the plurality of images inputted through the plurality of image pickup units.

5. The digital photographing apparatus of claim 1, wherein the second image processing unit extracts the common angle of view information from a distance between the digital photographing apparatus and the subject and the angle of view information.

6. A method of controlling a digital photographing apparatus comprising a plurality of image pickup units, disposed on a front surface of a single portable enclosure, that capture a plurality of images, each of the plurality of images showing a different parallax with respect to a subject, the method comprising:

generating a single input image from the plurality of images inputted through the plurality of image pickup units, each of the plurality of image pickup units comprising angle of view information;

generating a display image comprising a common angle of view region visually displayed on the single input image, denoting an area in which the angle of view information of each of the plurality of image pickup units overlaps;

displaying the display image;

extracting unit that extracts an output signal when the subject is beyond the common angle of view region in the display image including the common angle of view information; and outputting the output signal.

7. The method of claim 6, wherein the display image comprises an OSD representing the common angle of view information.

8. The method of claim 6, wherein a region of the display image excluding the common angle of view information is colored black.

9. The method of claim 6, wherein the generating of the single input image comprises generating the single input image by combining the plurality of images inputted through the plurality of image pickup units.

10. The method of claim 6, further comprising extracting the common angle of view information from a distance between the digital photographing apparatus and the subject and the angle of view information.

11. A non-transitory computer readable recording medium having a computer program stored thereon for executing the method of controlling a digital photographing apparatus of claim 6.

* * * * *